United States Patent [19]

Karlsson

[11] Patent Number: 5,476,269
[45] Date of Patent: Dec. 19, 1995

[54] SEAL FOR A RAIL VEHICLE SLACK ADJUSTER

[75] Inventor: Uno Karlsson, Malmö, Sweden

[73] Assignee: SAB WABCO AB, Netherlands

[21] Appl. No.: 256,249

[22] PCT Filed: Dec. 29, 1992

[86] PCT No.: PCT/SE92/00897

§ 371 Date: Jan. 12, 1995

§ 102(e) Date: Jan. 12, 1995

[87] PCT Pub. No.: WO93/14965

PCT Pub. Date: Aug. 5, 1993

[30] Foreign Application Priority Data

Jan. 22, 1992 [SE] Sweden ................. 9200180

[51] Int. Cl.⁶ ............................ F16J 15/16; B61H 15/00
[52] U.S. Cl. ............................ 277/24; 277/214; 277/215; 188/198; 188/322.12
[58] Field of Search ................ 277/24, 29, 134, 277/152, 214, 215; 188/322.12, 198

[56] References Cited

U.S. PATENT DOCUMENTS

| | | | |
|---|---|---|---|
| 2,054,863 | 9/1936 | Oliver | 277/214 |
| 2,196,337 | 4/1940 | Loweke | 277/215 |
| 3,955,859 | 5/1976 | Stella | 277/215 |
| 4,344,631 | 8/1982 | Winn | 277/29 |
| 4,425,838 | 1/1984 | Pippert | 277/24 |
| 4,482,160 | 11/1984 | Yanagi et al. | 277/29 |
| 4,592,559 | 6/1986 | Harvey | 277/214 |
| 4,706,968 | 11/1987 | Orlowski | 277/24 |
| 5,025,900 | 6/1991 | Severinsson | 188/322.12 |

FOREIGN PATENT DOCUMENTS 277264  1/1960  Australia ................. 277/215

Primary Examiner—Scott W. Cummings
Attorney, Agent, or Firm—Laurence R. Brown

[57] ABSTRACT

An end piece or barrel head (1) for an axial slack adjuster is at its outer periphery connected to a barrel (2) of the adjuster and is arranged around a rotatably and axially movable tube (3). The end piece is provided with an internal, circumferential groove (4), connected to the exterior by means of a number of channels (5) opening in the end wall (1') of the end piece for allowing water collected in the groove to freely pass out to the exterior.

1 Claim, 1 Drawing Sheet

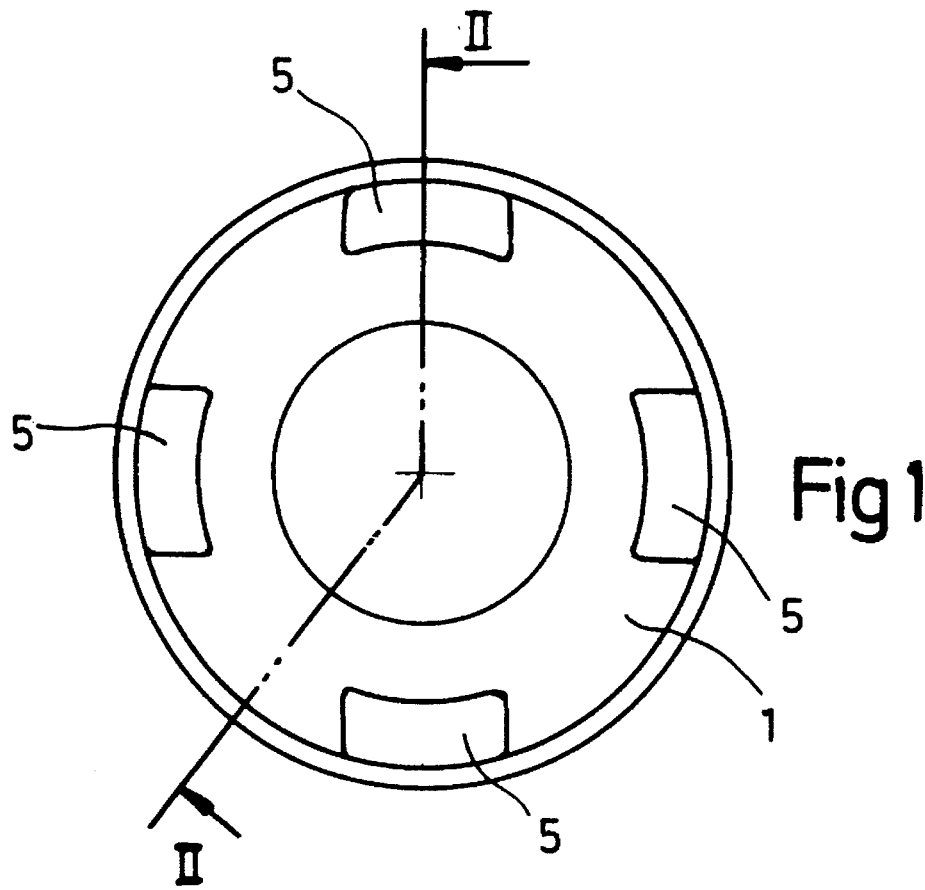
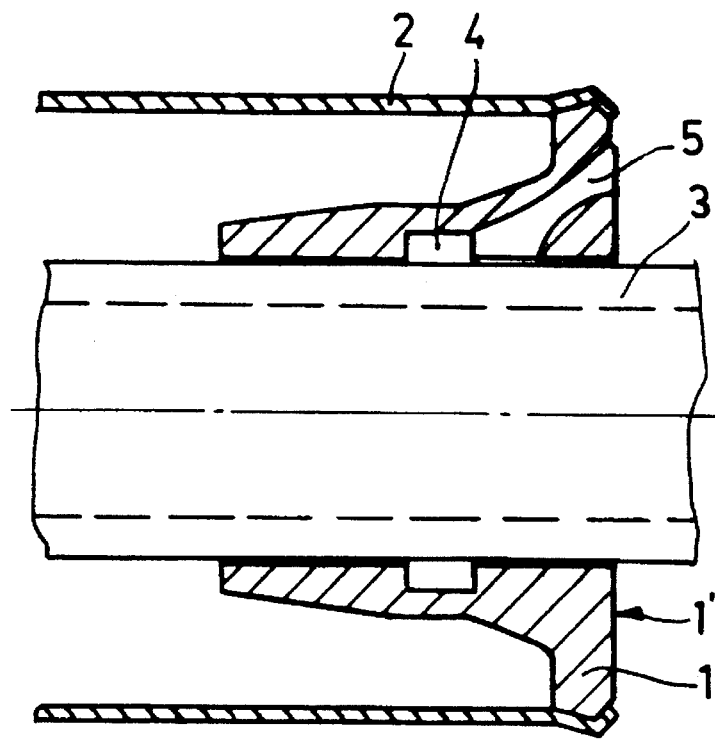

SEAL FOR A RAIL VEHICLE SLACK ADJUSTER

TECHNICAL FIELD

This invention relates to an end piece for an axial slack adjuster, at its outer periphery connected to a barrel of the adjuster and sealingly cooperating with a tube, which is rotatably and axially movable relative to the end piece.

BACKGROUND OF THE INVENTION

Rail vehicle slack adjusters work in an extremely harsh environment underneath the vehicles, which means that the sealing arrangements have to be effective so as to protect all interior details against moisture, water, snow, dust and so forth. The problem is enhanced by the extremely long intervals between interior services of the slack adjusters.

At an end piece or barrel head of the kind defined above it has so far been customary to provide as tight sealings as possible between the tube and the end piece, for example by means of two effective sealing rings in the end piece. However, due to the mutual movements between the parts, a certain under-pressure could be created inside the slack adjuster sucking moist, water and dust into the adjuster without any possibility to get out again. It goes without saying that such contaminants inside the adjuster can cause harm.

THE INVENTION

The present invention is based on the different philosophy that the creation of an under-pressure inside the adjuster shall be obviated and that any contaminants entering the end piece around the tube shall be given the opportunity to leave without getting into the adjuster itself.

This is according to the invention attained in that the end piece is provided with an internal, circumferential groove around the tube and that this groove is connected to the exterior by means of a number of channels opening in the end wall of the end piece.

These channels have the purpose of allowing any contaminants collected in the groove to freely pass out to the exterior. As the way out through the channels is so easy to follow, no contaminants will continue into the adjuster.

BRIEF DESCRIPTION OF THE DRAWING

The invention will be described in further detail below reference being made to the accompanying drawing, in which FIG. 1 is an end-view of an end piece according to the invention and FIG. 2 is a side-view, partly in section, of an axial slack adjuster provided with such an end piece, shown in a section along the line II–II in FIG. 1.

DETAILED DESCRIPTION OF A PREFERRED EMBODIMENT

A cylindrical end piece or barrel head 1 is attached to a tubular barrel 2 of a conventional axial slack adjuster for a railway vehicle. It is to cooperate with a rotatably and axially movable tube 3 and accordingly has an inner diameter corresponding to the outer diameter of this tube 3.

At a certain distance from its end wall 1' the end piece 1 is provided with a circumferential groove 4 around the tube 3 for collecting any contaminants (like water) which have entered from the exterior along the tube 3.

For allowing these contaminants to freely leave the groove 4 there are a number of channels 5 connecting the groove 4 with the end wall 1'. In the shown case there are four channels 5, so that contaminants collected in the groove 4 can freely leave through a channel 5 irrespective of the angular position of the end piece 1. The inclination of the channels 5 is chosen so that a free flow is guaranteed.

Without departing from the spirit and scope of the invention modifications are possible. It may for example be possible to provide the end piece 1 with one or more internal sealing rings.

I claim:

1. An end piece annular seal for a shaft movable axially and rotatably relative to a slack adjuster barrel, said seal functioning for preventing external contaminants from entering the slack adjuster barrel, comprising in combination:

said shaft having an outer diameter, said shaft adjuster, having a barrel end disposed about said shaft, and a sealing member connected as an end piece to said barrel having an internal diameter bore corresponding to the diameter of said shaft, said sealing member being disposed along the shaft with an intermediate circumferential groove extending about the shaft to form a compartment for accumulating contaminants entering externally into the groove through the end piece, and provided with channels extending from the groove outwardly to the exterior providing a preferred path of greater dimension for contaminants to leave the groove relative to any path inwardly directed between the shaft and the sealing member.

* * * * *